US012688094B2

(12) United States Patent
Zagorski et al.

(10) Patent No.: US 12,688,094 B2
(45) Date of Patent: Jul. 21, 2026

(54) GENERATING DIFFS BETWEEN ARCHIVES USING A GENERIC GRAMMAR

(71) Applicant: MICROSOFT TECHNOLOGY LICENSING, LLC, Redmond, WA (US)

(72) Inventors: Mark W. Zagorski, Redmond, WA (US); Mario Henrique Santos Da Silva, Redmond, WA (US); Elijah Wigmore, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/148,797

(22) Filed: Dec. 30, 2022

(65) Prior Publication Data

US 2024/0020201 A1 Jan. 18, 2024

Related U.S. Application Data

(60) Provisional application No. 63/389,352, filed on Jul. 14, 2022.

(51) Int. Cl.
| | | |
|---|---|---|
| *G06F 11/1446* | (2026.01) | |
| *G06F 8/658* | (2018.01) | |
| *G06F 9/445* | (2018.01) | |

(52) U.S. Cl.
CPC .......... *G06F 11/1448* (2013.01); *G06F 8/658* (2018.02); *G06F 9/44536* (2013.01)

(58) Field of Classification Search
CPC ..................................................... G06F 8/658
See application file for complete search history.

(56) References Cited

U.S. PATENT DOCUMENTS

| | | | |
|---|---|---|---|
| 6,336,122 B1 * | 1/2002 | Lee | G06F 16/289 |
| | | | 709/219 |
| 6,535,894 B1 | 3/2003 | Schmidt et al. | |

(Continued)

OTHER PUBLICATIONS

"Creating an Update File", Retrieved From: https://docs.updatefactory.io/devices/linux/update-files/, Retrieved From: Jun. 17, 2022, 7 Pages.

(Continued)

*Primary Examiner* — Brittany N Allen
(74) *Attorney, Agent, or Firm* — David Foster; Newport IP, LLC

(57) ABSTRACT

The techniques disclosed herein generate minimally sized diff archives. As a result, bandwidth, storage, and processing costs of storing or transmitting an archive are reduced. In some configurations, a diff archive is generated utilizing specific knowledge of the structure of the source and target archives it is derived from. Specifically, an archive-specific tokenization engine identifies data chunks and payload files within each archive. Recipes for generating payload files from data chunks and data chunks from payload files are identified and stored in a manifest file, as are recipes for decompressing files, concatenating data chunks, and generating binary deltas that convert older versions of a file into a newer version. These recipes are composed by replacing recipe inputs with the outputs of other recipes. Composite recipes use inline data and data obtained from a copy of the source archive to reconstitute the target archive.

20 Claims, 13 Drawing Sheets

(56) References Cited

U.S. PATENT DOCUMENTS

| | | | | |
|---|---|---|---|---|
| 8,909,881 | B2 * | 12/2014 | Bunte ................... | G06F 16/325 |
| | | | | 711/161 |
| 9,042,386 | B2 * | 5/2015 | Lynar ................. | H04L 67/1095 |
| | | | | 370/400 |
| 9,250,888 | B2 | 2/2016 | Doan et al. | |
| 9,317,280 | B2 | 4/2016 | Li et al. | |
| 10,860,310 | B2 | 12/2020 | Bainville et al. | |

OTHER PUBLICATIONS

May, Michael J. , "Donag: Generating Efficient Patches and Diffs for Compressed Archives", In Journal of ACM Transactions on Storage, Jul. 27, 2022, 44 Pages.
"International Search Report and Written Opinion issued in PCT Application No. PCT/US23/024894", Mailed Date: Oct. 4, 2023, 9 Pages.
Tichy, Walter F. , "RCS—A System for Version Control", In Journal of Software-Practice & Experience, vol. 15 Issue 7, Jul. 1, 1985, pp. 637-654.
Communication pursuant to Article 94(3) received in European Application No. 23738316.1, mailed on Oct. 22, 2025, 08 pages.
Communication pursuant to Article 94(3) received for European Application No. 23738316.1, mailed on Mar. 4, 2026, 05 Pages.

* cited by examiner

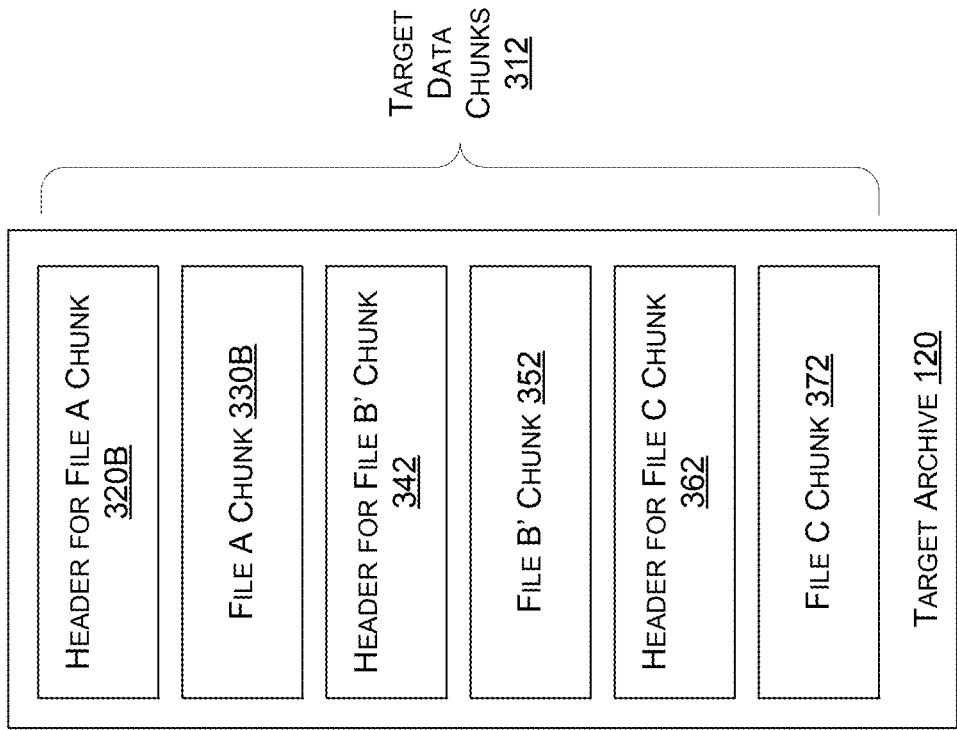
TARGET DATA CHUNKS 312
HEADER FOR FILE A CHUNK 320B
FILE A CHUNK 330B
HEADER FOR FILE B' CHUNK 342
FILE B' CHUNK 352
HEADER FOR FILE C CHUNK 362
FILE C CHUNK 372
TARGET ARCHIVE 120
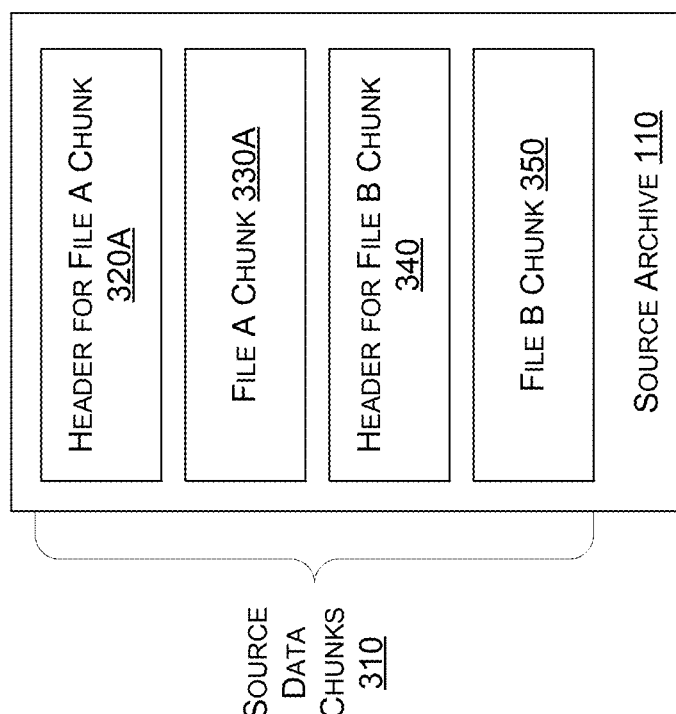
HEADER FOR FILE A CHUNK 320A
FILE A CHUNK 330A
HEADER FOR FILE B CHUNK 340
FILE B CHUNK 350
SOURCE ARCHIVE 110
SOURCE DATA CHUNKS 310
FIG. 3

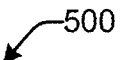
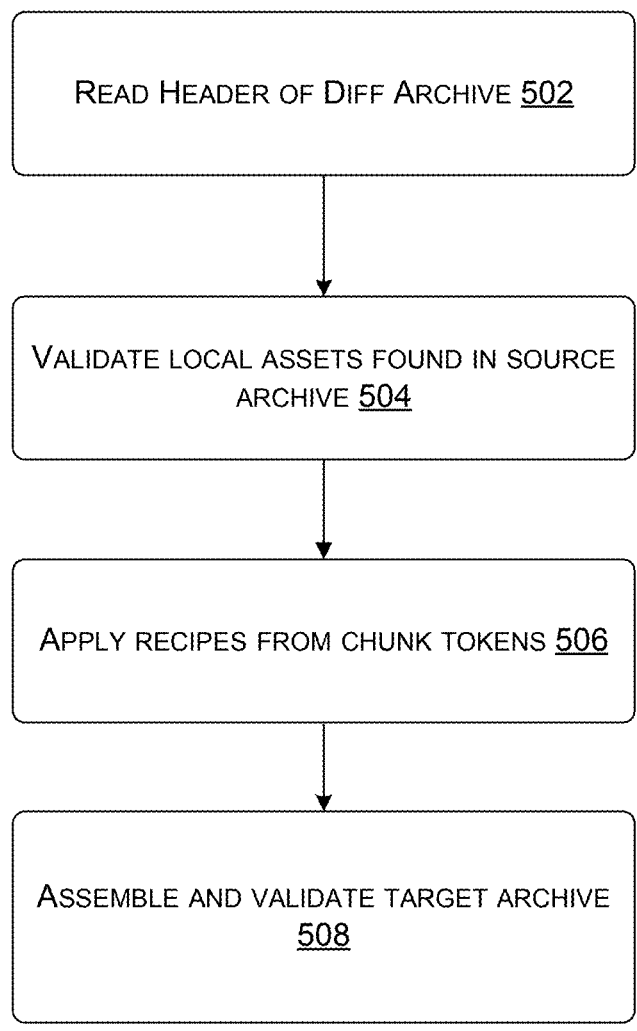
READ HEADER OF DIFF ARCHIVE <u>502</u>
VALIDATE LOCAL ASSETS FOUND IN SOURCE ARCHIVE <u>504</u>
APPLY RECIPES FROM CHUNK TOKENS <u>506</u>
ASSEMBLE AND VALIDATE TARGET ARCHIVE <u>508</u>
FIG. 5

FIG. 6B

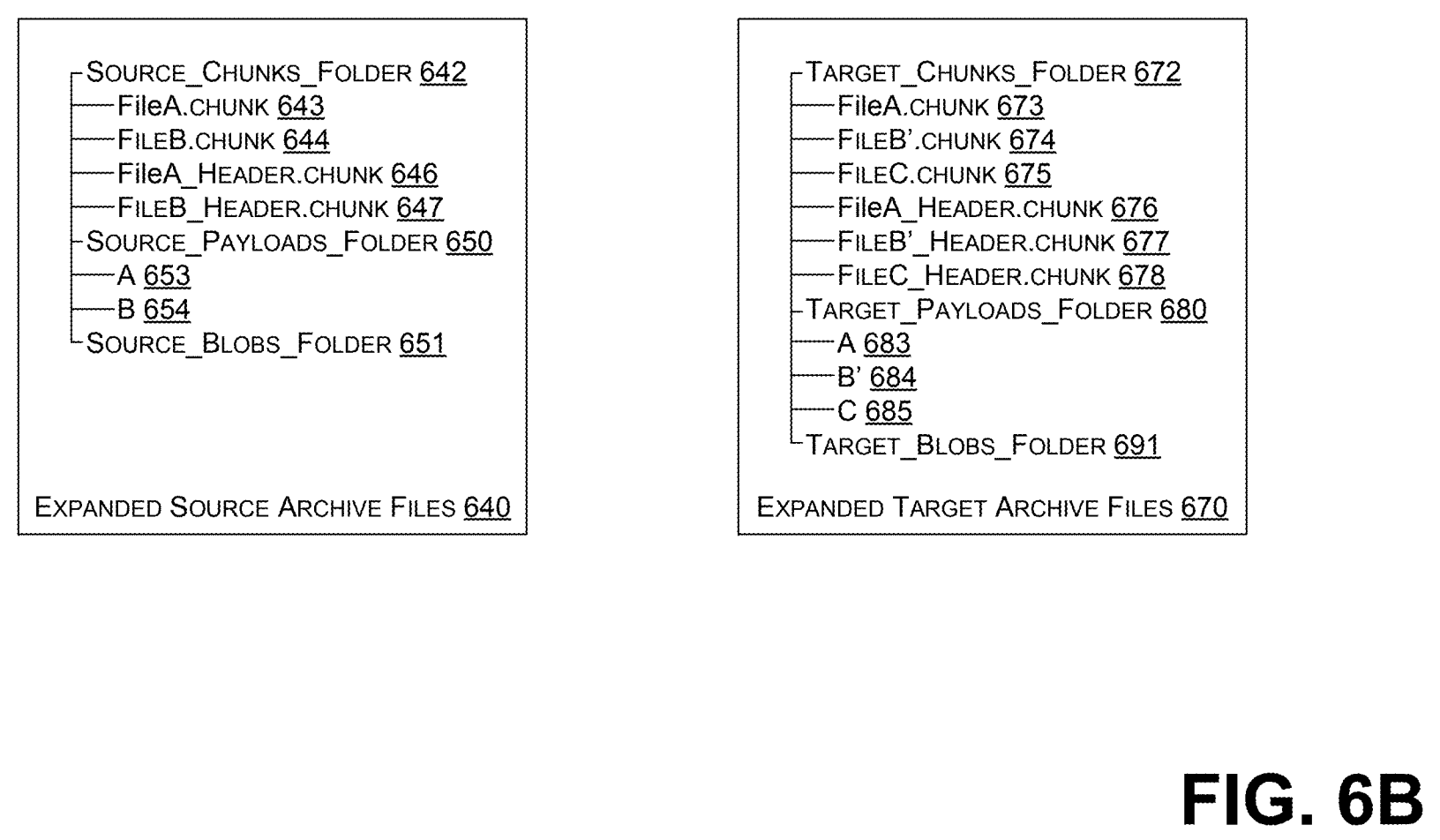

TARGET_CHUNKS_FOLDER 672
├── FileA.CHUNK 673
├── FileB'.CHUNK 674
├── FileC.CHUNK 675
├── FileA_HEADER.CHUNK 676
├── FileB'_HEADER.CHUNK 677
├── FileC_HEADER.CHUNK 678
├── TARGET_PAYLOADS_FOLDER 680
│   ├── A 683
│   ├── B' 684
│   └── C 685
└── TARGET_BLOBS_FOLDER 691

EXPANDED TARGET ARCHIVE FILES 670

SOURCE_CHUNKS_FOLDER 642
├── FileA.CHUNK 643
├── FileB.CHUNK 644
├── FileA_HEADER.CHUNK 646
├── FileB_HEADER.CHUNK 647
├── SOURCE_PAYLOADS_FOLDER 650
│   ├── A 653
│   └── B 654
└── SOURCE_BLOBS_FOLDER 651

EXPANDED SOURCE ARCHIVE FILES 640

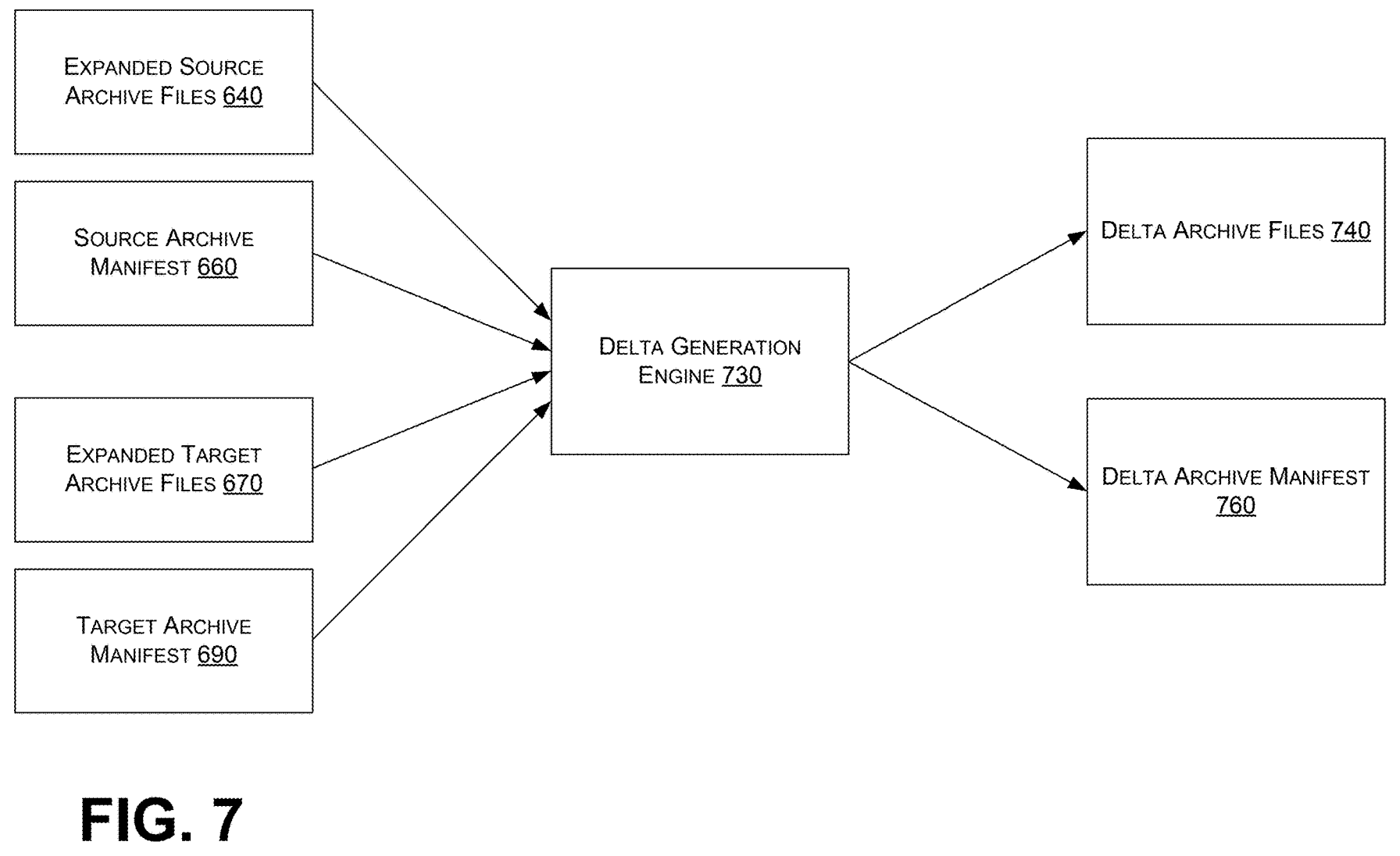

DELTA ARCHIVE FILES 740

DELTA ARCHIVE MANIFEST 760

DELTA GENERATION ENGINE 730

EXPANDED SOURCE ARCHIVE FILES 640

SOURCE ARCHIVE MANIFEST 660

EXPANDED TARGET ARCHIVE FILES 670

TARGET ARCHIVE MANIFEST 690

FIG. 7

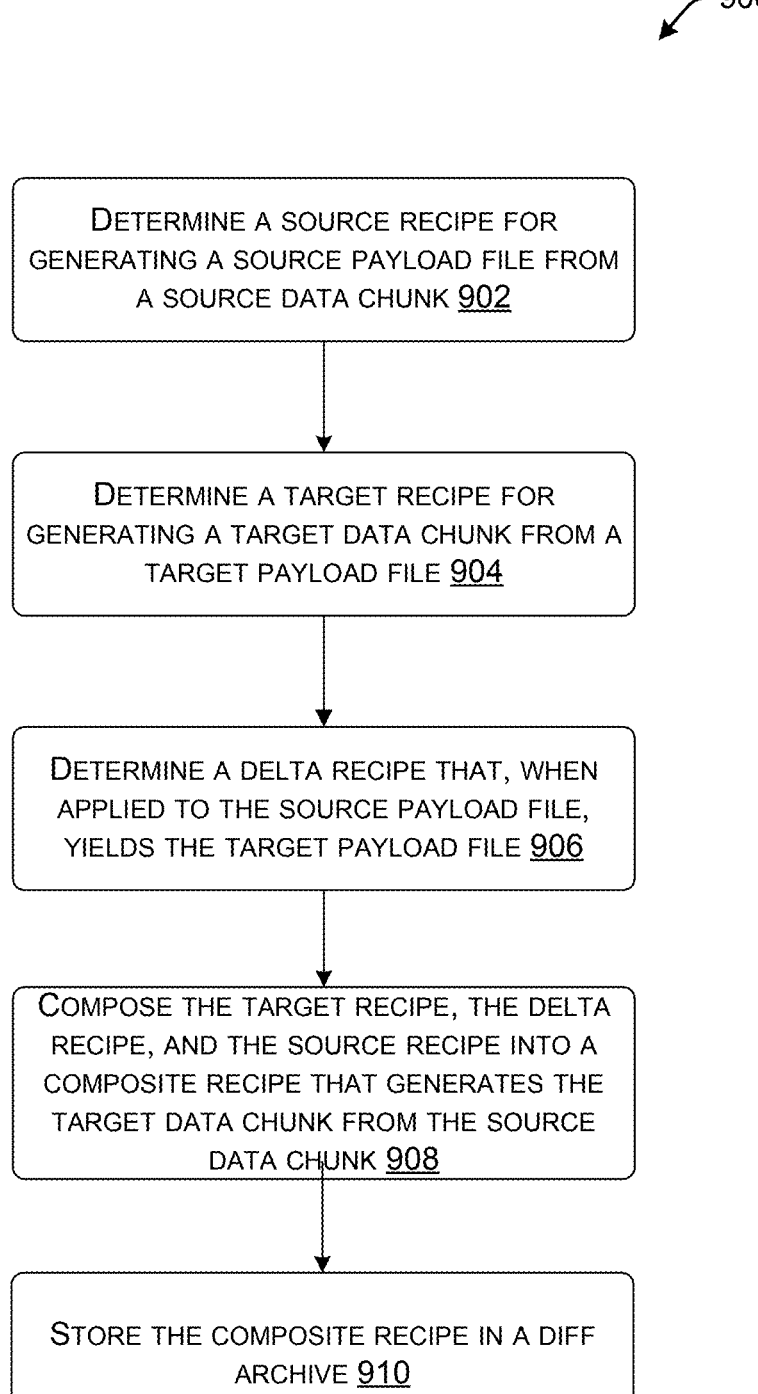

900

DETERMINE A SOURCE RECIPE FOR GENERATING A SOURCE PAYLOAD FILE FROM A SOURCE DATA CHUNK 902

DETERMINE A TARGET RECIPE FOR GENERATING A TARGET DATA CHUNK FROM A TARGET PAYLOAD FILE 904

DETERMINE A DELTA RECIPE THAT, WHEN APPLIED TO THE SOURCE PAYLOAD FILE, YIELDS THE TARGET PAYLOAD FILE 906

COMPOSE THE TARGET RECIPE, THE DELTA RECIPE, AND THE SOURCE RECIPE INTO A COMPOSITE RECIPE THAT GENERATES THE TARGET DATA CHUNK FROM THE SOURCE DATA CHUNK 908

STORE THE COMPOSITE RECIPE IN A DIFF ARCHIVE 910

FIG. 9

Figure 11:
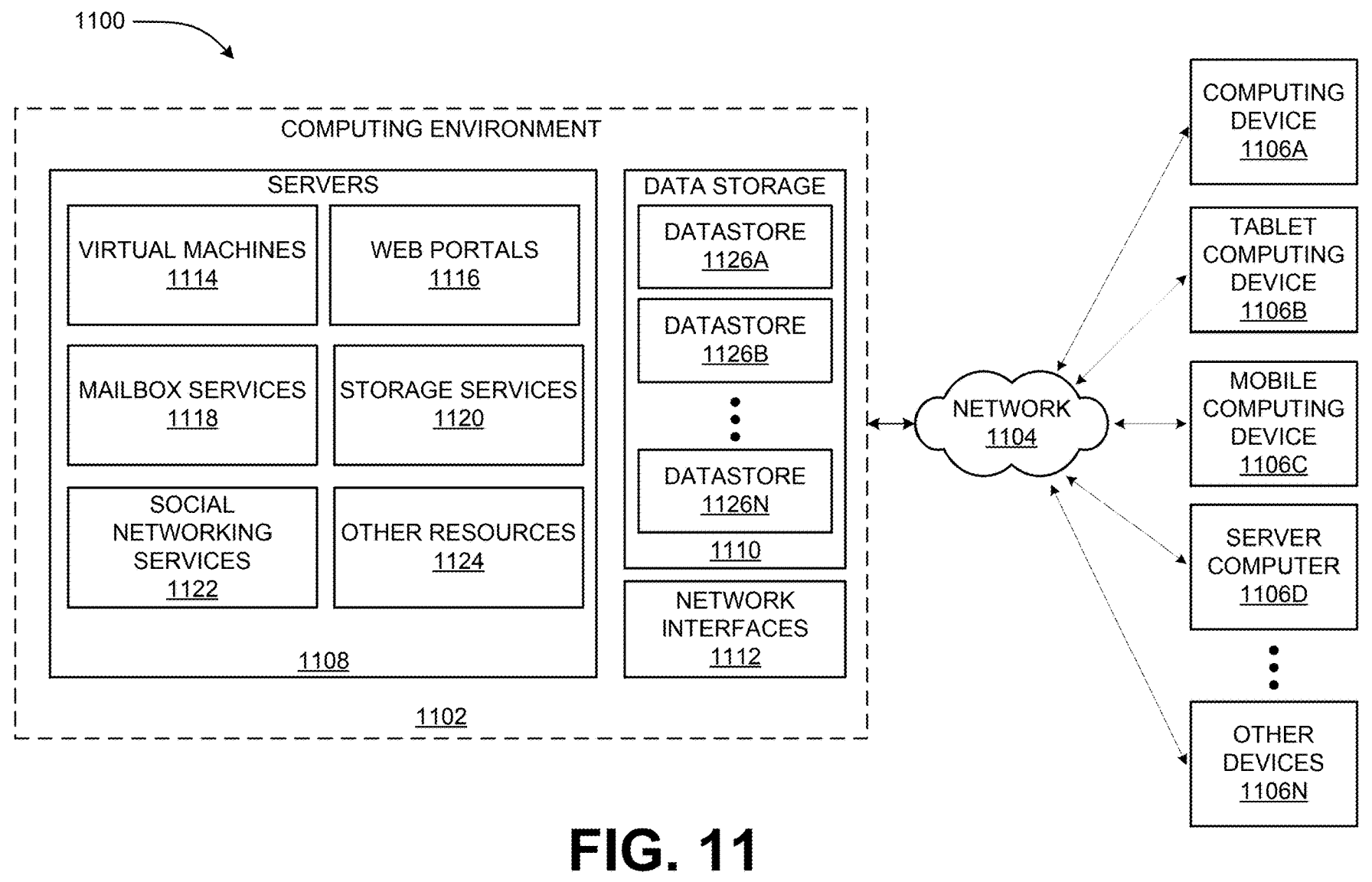

COMPUTING DEVICE 1106A

TABLET COMPUTING DEVICE 1106B

MOBILE COMPUTING DEVICE 1106C

SERVER COMPUTER 1106D

OTHER DEVICES 1106N

NETWORK 1104

COMPUTING ENVIRONMENT

DATA STORAGE

DATASTORE 1126A

DATASTORE 1126B

DATASTORE 1126N

1110

NETWORK INTERFACES 1112

SERVERS

VIRTUAL MACHINES 1114

WEB PORTALS 1116

MAILBOX SERVICES 1118

STORAGE SERVICES 1120

SOCIAL NETWORKING SERVICES 1122

OTHER RESOURCES 1124

GENERATING DIFFS BETWEEN ARCHIVES USING A GENERIC GRAMMAR

PRIORITY APPLICATION

The present application is a non-provisional application of, and claims priority to, U.S. Provisional Application Ser. No. 63/389,352 filed on Jul. 14, 2022, the contents of which are hereby incorporated by reference in their entirety.

BACKGROUND

The number of computing devices in the world is increasing, as is average software application size and the number of software applications people use throughout their day. The increased reach of computing has many beneficial effects, but one downside is a significant increase in the cost of keeping software up to date. Software updates are predominantly distributed over a network. As a result, bandwidth costs are directly related to the size of a software update. Storage and processing costs also increase with the size of a software update. These costs are particularly significant to computing devices with limited or expensive computing resources such as wearable computing devices, smart home devices, and other Internet of Things (IoT) devices.

It is with respect to these and other considerations that the disclosure made herein is presented.

SUMMARY

The techniques disclosed herein generate minimally sized diff archives. As a result, bandwidth, storage, and processing costs of storing or transmitting an archive are reduced. In some configurations, a diff archive is generated utilizing specific knowledge of the structure of the source and target archives it is derived from. Specifically, an archive-specific tokenization engine identifies data chunks and payload files within each archive. Recipes for generating payload files from data chunks and data chunks from payload files are identified and stored in a manifest file, as are recipes for decompressing files, concatenating data chunks, and generating binary deltas that convert older versions of a file into a newer version. These recipes are composed by replacing recipe inputs with the outputs of other recipes. Composite recipes use inline data and data obtained from a copy of the source archive to reconstitute the target archive.

A software archive is a file that contains other files. Examples include TAR, ZIP, WIM and CAB files. A software application update is one example of a software archive. Application updates generated with the disclosed techniques may be installed in less time and with fewer computing resources than a block-based diff update. While this document primarily refers to software updates, any other type of software archive is similarly contemplated. For example, software archives are also used to backup or transmit groups of files while maintaining a directory structure.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3 illustrates example data chunks contained in source and target archives.

FIG. 5 is a flow diagram of an example method for applying a diff archive to generate a copy of a target archive.

FIG. 6B illustrates example trees of data chunks and payload files expanded from archives.

FIG. 7 illustrates generating binary deltas from payload files in the source and target archives.

FIG. 9 is a flow diagram of an example method for generating a composite archive.

FIG. 11 is a diagram illustrating an example distributed computing environment capable of implementing aspects of the techniques and technologies presented herein.

DETAILED DESCRIPTION

Figure 1:
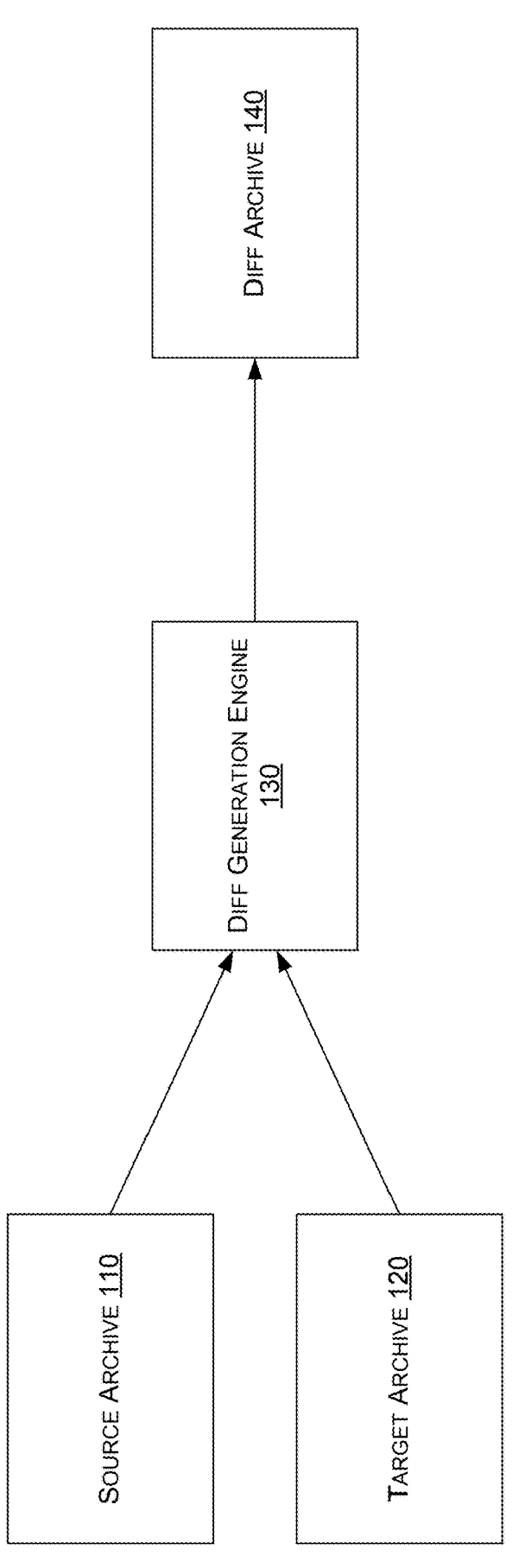
FIG. 1 illustrates generating an example diff archive from a source archive and a target archive.

Some software updates are distributed as a stand-alone installation that completely replaces an existing version of the software. In these scenarios, all of the data from the existing version is removed from the system and the new version is installed completely from the update. In these scenarios, the new version is downloaded in its entirety, even if the only change from the existing version is a small modification to a single file. For example, when using a stand-alone installation technique, a minor release of an operating system may require that the entire operating system be downloaded and installed. In addition to the high bandwidth and processing costs, installation times may also be high due to the necessity of uninstalling and reinstalling a large number of components.

One improvement over a stand-alone update is to package an update as a "diff". A diff stores what has changed compared to a previous version of the software. Diff updates take advantage of the fact that incremental releases of a software application may share a vast majority (e.g., 95%) of their data with the previous version. When installing a diff update, data is obtained from the diff update itself and from the local computing device. There are many techniques for generating a diff. For example, a block-based diff performs a block-by-block binary comparison between the new update and a previous version of the update. When a match is found, the matching block is replaced in the new update with a reference to the block in the previous version of the update.

Block-based diffs are an improvement over distributing stand-alone installations. However, block-based diffs are ineffective under common scenarios such as the inclusion of compressed files in the update. File compression has the effect of propagating even a small change throughout the entire file, significantly limiting the number of blocks that can be re-used. Block-based diffs also have difficulty when the data contained in updates is not generated in a deterministic order. If the files in the two updates appear in different orders, then the blocks may not match up unless special care is taken to adjust block alignment according to file order. As a result of these deficiencies, diff updates generated by a block-based binary comparison are larger than necessary, incurring additional bandwidth costs, processing costs, and leading to increased installation times.

To address the above and other issues, techniques have been developed to use a generic grammar to generate a diff archive from a source archive and a target archive. Once deployed, the diff archive may be expanded to create a copy of the target archive using inline data and data obtained from a local copy of the source archive. The generic grammar is used to describe the contents of the source archive and the target archive. These descriptions are then used to create recipes that recreate portions of the target archive from data stored in the local copy of the source archive. As referred to herein, an archive refers to a file that contains other files. Examples of commonly used archives include .tar files or ext4, which is a Linux file system.

Most archives are physically laid out as a series of "data chunks," which are regions of the archive defined by a byte offset and a length. Files that can be extracted from the archive are referred to as "payload files", and may be stored in a single data chunk or spread across multiple data chunks. Archive metadata may also be stored in data chunks, e.g. headers that store information about payload files such as file name, file size, or whether the file is compressed.

To generate a diff archive, a diff generation engine first identifies the data chunks and payload files contained in the source and target archives. The diff generation engine may store this information as a series of data chunk tokens and payload file tokens in source and target manifest files. The diff generation engine then adds recipes to each token describing how the data referred to by that token can be generated in terms of data referred to by other tokens.

For instance, a given payload file may be split into multiple data chunks (e.g., in an ext4 filesystem). The diff generation engine creates a data chunk token in a manifest file for each of the data chunks. The diff generation engine also creates a payload file token in the manifest file for the given payload file. Then, for each of the data chunk tokens, the diff generation engine may create a recipe that describes how to generate that token's corresponding data chunk from the payload file. The diff generation engine may also create a recipe for the payload file token that describes how to generate the given payload file from the data chunks.

More complicated archive layouts are handled by nesting recipes. A nested recipe generates an intermediate result that is further transformed by additional recipes. For example, a payload file may be compressed, in which case two recipes may be used to extract the payload file—one recipe to generate the compressed file from data chunks, and another recipe to decompress the result of the first recipe. Additional levels of nesting may be required. For example, if a payload file is itself an archive, the entire diff generation process may be recursively applied to this sub-archive.

When manifest files containing data chunk tokens, payload file tokens, and recipes have been created for two different archives, the diff generation engine can compare the contents of the manifests to identify when data from the source archive can be used to generate data that appears in the target archive. Exact matches of data chunks and/or payload files may be identified by comparing hash values. When an exact match of a data chunk is found, the data chunk may be omitted from the diff archive and replaced with a recipe for obtaining the identical data directly from the source archive. When payload files match exactly, composite recipes may be created that use data chunks from the source archive to create the payload file, which is then used to recreate the data chunks that store the payload file in the target archive.

Payload files that do not match exactly may still be utilized to reduce the size of the diff archive. To do this, the diff generation engine applies delta compression to convert the version of the payload file in the source archive into the version of the payload file in the target archive. During diff generation, delta compression performs a binary diff operation on the two versions of the payload file. The resulting binary delta is stored in the diff archive, and recipes for applying the binary delta are stored in the diff manifest. When applying the diff archive, the binary delta is applied to the source archive version of the payload file to generate the target archive version of the payload file. The result may be used as a parameter to another recipe, e.g. to reconstitute a data chunk from the target archive. Delta compression increases the number of files that can participate in recipe substitution, increasing the number of opportunities to reuse data stored in the source archive.

Each archive is processed with an archive-specific tokenization engine that has knowledge of file layout within the archive, including which payload files can be extracted, which data chunks are used to create each payload file, where data chunks are located within the archive, whether and how a payload file or data chunk is compressed, and the like. The tokenization engine translates this archive-specific information into the generic grammar in the form of tokens. By describing archive-specific information in tokens that are independent of archive type and file type, recipes from archives of different types may be composed. Also, adding support for an additional archive type or file type only requires adapting archive-specific or file-specific information into the generic grammar. Once the archive-specific or file-specific information has been adapted to the generic grammar, existing recipe composition and diff generation algorithms may be applied.

FIG. 1 illustrates diff generation engine 130 generating a diff archive 140 from a source archive 110 and a target archive 120. Diff archive 140 may be distributed to one or more computing devices for expansion and application.

Diff generation engine 130 may be used (e.g., by an organization) to create a diff update that updates an installed version of a software application to a newer version of the software application. In this scenario, source archive 110 is the update that was used to install the existing version of the software application, while target archive 120 is the update that upgrades the software application to the new version. Source archive 110 may be an archive used to perform the initial installation of the software application. Diff archive 140 is a diff update that uses inline data and data extracted from a copy of source archive 110 to create a copy of target archive 120. A software update module on the computing device may then use the reconstituted target update to upgrade the software application to the new version.

Figure 2:
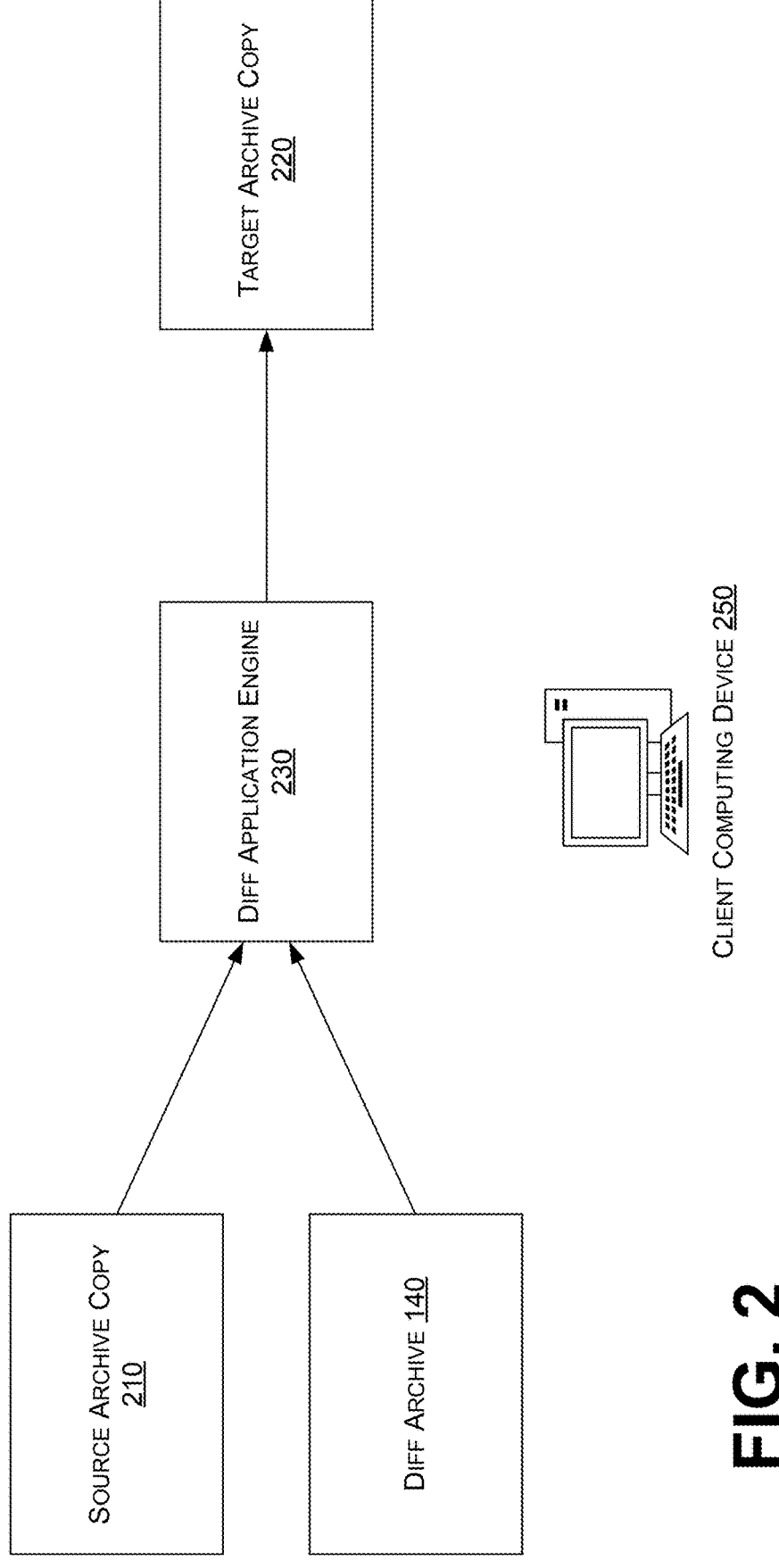
FIG. 2 illustrates applying an example diff archive with data from a source archive to reconstitute a target archive.

FIG. 2 illustrates diff application engine 230 applying diff archive 140 with data from source archive copy 210 to reconstitute a target archive copy 220 of target archive 120. Diff application engine 230 is commonly used by computing device 250. As discussed above in conjunction with FIG. 1, diff application engine 230 may be part of a software update module that expands a diff update into a target update using data contained in a source update copy that already exists on the computing device 250. The software update module may then apply the target update. Using diff archive 140 in this way saves the cost and time would take to download the entire target update. Diff application engine 230 may also use data from the installation of the existing version of the software application.

FIG. 3 illustrates data chunks contained in source archive 110 and target archive 120. Different archive formats may store payload files in different ways. As illustrated, source archive 110 has four data chunks 310—two header chunks and two body chunks: Header for file A chunk 320A, file A chunk 330A, header for file B chunk 340, and file B chunk 350. Target archive 120 contains target data chunks 312, including header for file A chunk 320B, file A chunk 330B, header for file B' chunk 342, file B' chunk 352, header for file C chunk 362, and file C chunk 372.

Figure 4A:
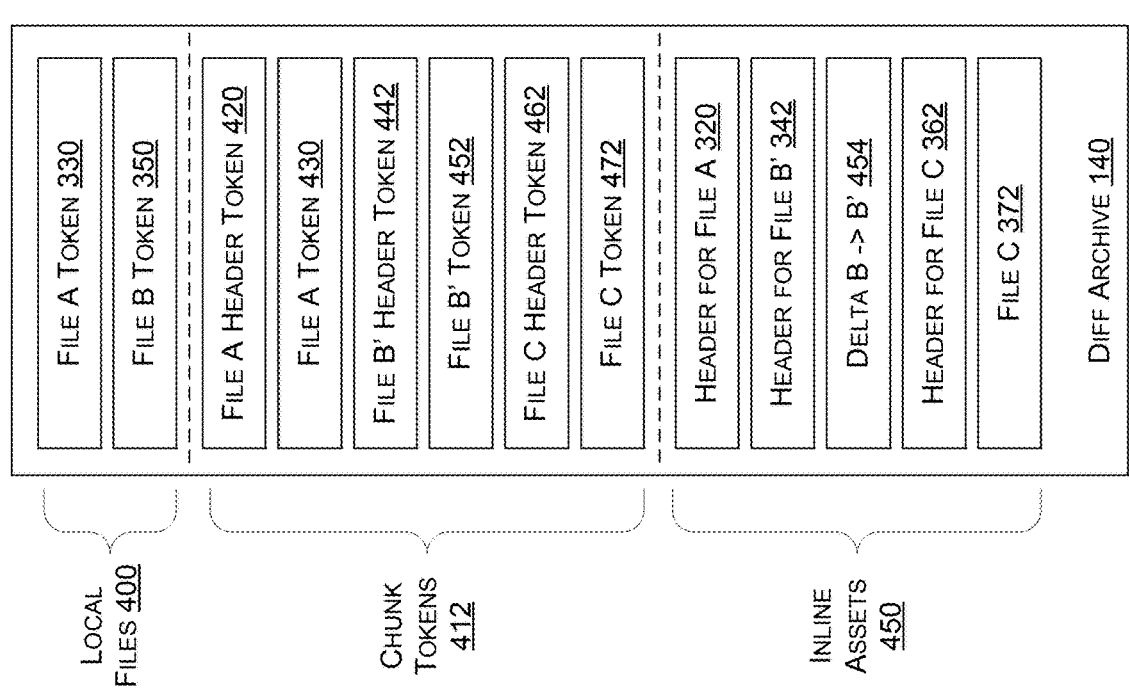
FIG. 4A illustrates an example diff archive.

FIG. 4A illustrates the contents of diff archive 140. Diff archive 140 contains a combination of tokens and inline assets. As referred to herein, a token is data or a reference to data stored in an archive. For example, tokens may refer to data, such as a data chunk 350, that is part of a source archive 110. Tokens may also refer to payload files that can be extracted from the archive, or to recipes for creating data from data referred to by other tokens. In addition to referencing data stored in an archive, tokens may themselves contain data, referred to as inline assets. Inline assets refer to headers, binary deltas, or even entire files stored in diff archive 140 that are needed to recreate target archive 120.

As illustrated, diff archive 140 contains local files 400 which includes file A token 330 and file B token 350. These tokens refer to payload files that may be obtained from outside of the diff archive—e.g. from a source archive copy 210. FIG. 4A also includes chunk tokens 412, which list all of the chunk tokens that appeared in target archive 120 and which will be reproduced when applying diff archive 140 to reconstitute a copy of target archive 120. Specifically, diff archive 140 contains header for file A token 420, file A token 430, header for file B' token 442, file B' token 452, header for file C token 462, and file C token 472.

Inline assets 450 include header for file A 320, header for file B' 342, binary delta from file B to file B' 454, header for file C 362, and file C 372. Some of inline assets 450 are verbatim copies of files that appear in target archive 120 but that do not appear in source archive 110, e.g. file C 372. When there is no corresponding data chunk or payload file in source archive 110, file C is copied in its entirety from target archive 120 to diff archive 140. Other inline assets are binary deltas that can be used to convert a version of a file found in source archive 110 into the version of the same file found in target archive 120, e.g. delta 454. Archive headers describe a file within an archive, and as such are particular to that archive. As headers are particular to the archive they appear in, they are not transferrable to a different archive. This is why header for file A 320 and headers 342 and 362 are included inline with diff archive 140, even though files A and B already have headers in source archive 110.

Figure 4B:
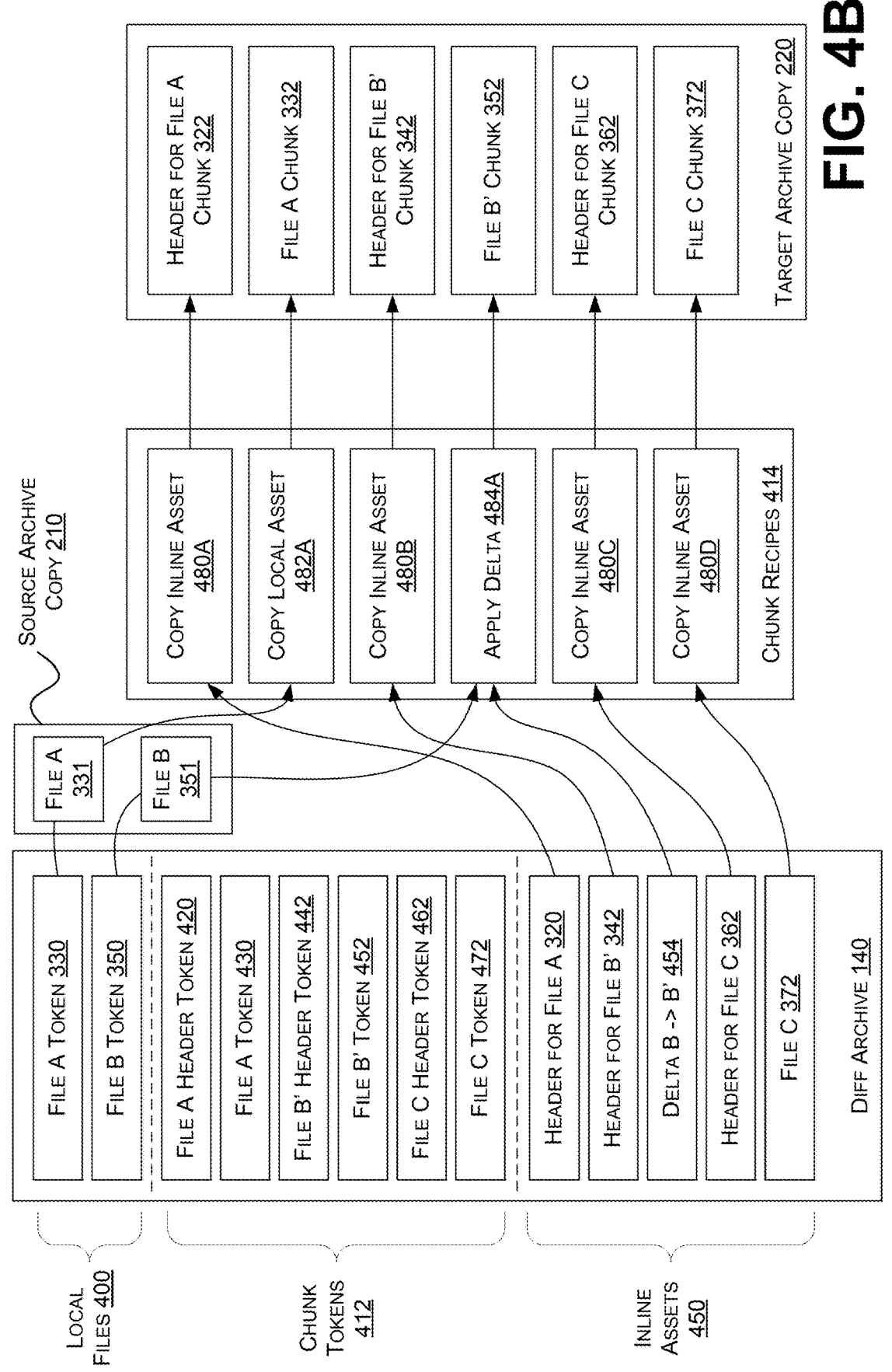
FIG. 4B illustrates applying an example diff archive with data from a copy of a source archive to generate a copy of a target archive.

FIG. 4B illustrates applying diff archive 140 with data from a source archive copy 210 to generate a target archive copy 220. In order for target archive copy 220 to be a complete binary match with target archive 120, diff application engine 230 iterates through each of chunk tokens 412 applying chunk recipes 414 to reconstitute each of target data chunks 312. As illustrated, file A header token 420 is associated with a recipe 480A that copies header for file A 320 from inline assets 450 into header for file A chunk 322. Header for file A 320 was made an inline asset because it is not found in source archive copy 210.

File A token 430 is associated with a recipe 482A that copies a local asset—in this case a chunk of file A 331—into file A chunk 332. Recipe 482A may refer to file A token 330 in order to determine how to obtain payload file 331.

File B' header token 442 is associated with copy inline asset recipe 480B. Copy inline asset recipe 480B causes header for file B' 342 to be copied directly from inline assets 450 of diff archive 140 into header for file B' chunk 342 of target archive copy 220.

File B' token 452 is associated with apply delta recipe 484A. Apply delta recipe 484A obtains data from file B of source archive copy 210, and applies binary delta 454 to yield a new version of file B. Some or all of the new version of file B is then stored as file B' chunk 352.

File C header token 462 and file C token 472 are associated with copy inline asset recipes 480C and 480D, respectively. File C does not exist in source archive 110, and so it must be stored in its entirety in diff archive 140. Copy inline asset recipes 480C and 480D copy header for file C 362 and file C 372 of inline assets 450 into header for file C 362 and file C chunk 372 of target archive copy 220, respectively.

The resulting target archive copy 220 is a perfect binary copy of target archive 120, indistinguishable from the original. In some configurations, this is confirmed by comparing a hash value of target archive 120 stored in diff archive 140 with a hash value computed from target archive copy 220. If source and target archives are software updates, a software update module may apply the target archive copy 220 to update the software application to the new version.

FIG. 5 is a flow diagram of an example method 500 for applying a diff archive 140 to generate a target archive copy 220. The method 500 begins with operation 502 by reading a header of a diff archive 140. The header of diff archive 140 may include a list of the tokens and inline assets contained in the diff archive 140. The header of diff archive 140 may also include a hash value of target archive 120.

The method continues with operation 504 by validating local assets such as local files 400 are available in source archive copy 210. If source archive copy 210 is not available, an error is raised.

Next, at operation 506, recipes associated with chunk tokens 412 are applied as discussed above in conjunction with FIG. 4B.

Next, at operation 508, target archive copy 220 is assembled and validated.

Figure 6A:
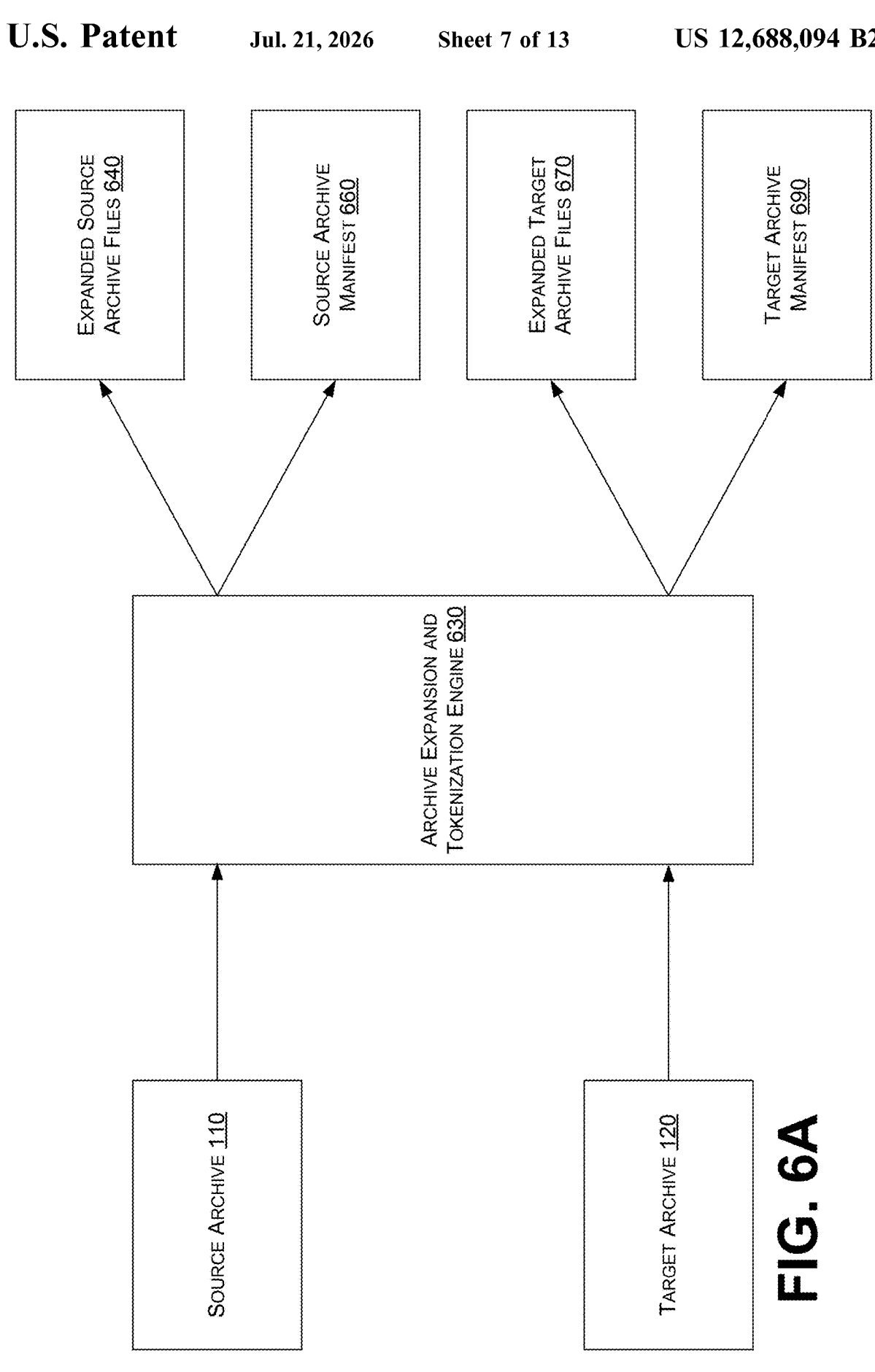
FIG. 6A illustrates expanding and tokenizing example source and target archives as part of diff archive generation.

FIG. 6A illustrates archive expansion and tokenization engine 630 expanding and tokenizing source archive 110 and target archive 120 as part of diff archive generation. Archive expansion and tokenization engine 630 may be part of diff generation engine 130.

Archive expansion and tokenization engine 630 may extract payload files and chunks from source archive 110. For example, archive expansion and tokenization engine 630 may generate source archive files 640 from source archive 110. Archive expansion and tokenization engine 630 may also generate source archive manifest 660 based on metadata included in source archive 110. Archive expansion and tokenization engine 630 similarly processes target archive 120 to generate expanded target archive files 670 and target archive manifest 690.

FIG. 6B illustrates one example of data chunks and payload files expanded from archives 110 and 120. Expanded source archive file 640 includes source chunks folder 642, source payloads folder 650, and source Binary Large Objects (blobs) folder 651. These folders are used to store files during diff generation. Archive expansion and tokenization engine 630 is able to perform binary comparisons, extract chunks, combine chunks, and perform other operations while generating diff archive 140 using the expanded chunks and payload files stored in these folders. As illustrated, source chunks folder 642 contains file A chunk 643, file B chunk 644, file A header chunk 646, and file B header chunk 647. These files are derived from source data chunks 310 of source archive 110. Source payloads folder 650 contains payload file A 653 and payload file B 654. Payload files A 653 and B 654 are identical to the files that would be extracted from source archive 110 using an archive expansion tool. In some scenarios, archive expansion and tokenization engine 630 constructs payload files 653 and 654 from chunks 643 and 644, respectively. In other scenarios, archive expansion and tokenization engine 630 uses an archive specific archive expansion tool to extract the payload files, such as the tar utility to extract payload files from a .tar file.

Expanded target archive files 670 similarly include target chunks folder 672, target payloads folder 680, and target blobs folder 691. Target chunks folder 672 contains files derived from target data chunks 312 of target archive 120. Specifically, target chunks folder 672 includes file A chunk 673, file B' chunk 674, file C chunk 675, file A header chunk 676, file B' header chunk 677, and file C header chunk 678. Target payloads folder 680 similarly includes payload files A 683, B' 684, and C 685.

Source blobs folder 651 and target blobs folder 691 are used to store blobs that are the result of a recipe, and which may be supplied as a parameter to a different recipe.

Archive expansion and tokenization engine 630 may generate a manifest file that describes the contents of an archive. For example, archive expansion and tokenization engine 630 may generate source archive manifest 660 from source archive 110 and target archive manifest 690 from target archive 120. As described in more detail below, data from source and target archive manifests may be combined to generate a diff archive that uses data from a copy of the source archive to provide payload files contained in the target archive.

A manifest file contains tokens that describe the contents of an archive. For example, a manifest file may contain tokens that describe payload files that are extractable from the archive. For example, source archive manifest 660 may contain payload file tokens that describe payload file A 653 and payload file B 654 of source archive 110.

Archives often store a payload file as a single data chunk within the archive—a single contiguous block of storage. However, instead of storing a payload file in a single data chunk, archives often split payload files into data chunks that are distributed throughout the archive. A data chunk token describes a data chunk found in an archive. For example, source archive manifest 660 may include data chunk tokens that describe file A chunk 643, file A header chunk 646, and other data chunks of source archive 110.

A token in a manifest file may be associated with recipes that describe how to obtain the token's item. Recipes may reference data chunks or payload files. For example, a data chunk token may include a recipe that refers to a payload file of source archive 110, while a payload file token may include a recipe that refers to one or more data chunks of source archive 110. A manifest file may also include properties of the archive itself, such as a name of the archive, a date and time at which it was created, a version number, and the like.

Each data chunk token includes an identifier, such as "HeaderChunkA", an offset from the start of the archive where the data chunk begins, and the length of the data chunk. Each data chunk token may also include one or more hash values used to perform a binary comparison to a different data chunk, often from a different archive. Hash values are typically generated by cryptographic hash functions such as SHA256 or MDS. These algorithms digest the chunk or file into a fixed length string of digits that uniquely identifies the chunk or file, respectively. Hash values may be of varying lengths, such as 80 bytes, 256 bytes, 1024 bytes, or the like.

As described briefly above, recipes included in a manifest file describe how to obtain data chunks and payload files from a corresponding archive. Recipes may have an identifier, a type, an operation that performs the recipe, and other recipe-specific input and/or output parameters. The recipe identifier may be used by one recipe to refer to another, allowing recipes to be nested or otherwise composed. The recipe type indicates what type of data the recipe generates, e.g., a data chunk, a payload file, or in the case of an intermediate recipe, a blob of bytes. The operation indicates how the recipe is performed. Examples include copying a single data source to generate the output, concatenating data from multiple data sources, gathering data from a particular region of a data source, transforming a data source (e.g. compressing, decrypting).

For example, a recipe with a "CopyFile" operation may yield a payload file a from a single data chunk. As illustrated, the "CopyFile" recipe performs a binary copy of the contents of FileA.chunk 643 to generate a copy of payload file A 653. One of the input parameters to the "CopyFile" recipe may identify the source data chunk, while an output parameter may identify the name of the payload file. Recipes for creating a payload file from multiple chunks, as well as other operations, are discussed below.

In some configurations, a data chunk token includes an identifier, a name, a type, an offset within source archive 110, a length, and one or more hash values. The data chunk token identifier may be used to reference a data chunk token from a payload file or a recipe, allowing a payload file recipe to describe how to generate a payload file by reference to a data chunk. The token name may be descriptive, e.g., it may be used for debugging purposes. The data chunk token offset indicates a byte offset into the archive file 110 of the data chunk, while the length indicates the number of bytes in the data chunk.

In some configurations, payload file tokens contain similar attributes as data chunk tokens, including an identifier, a type, a length, and a hash value. A payload file token may also include a location on disk where archive expansion and tokenization engine 630 copied the corresponding payload file, e.g., as part of expanded source archive files 640. This file location allows a diff generation engine to locate the payload file when creating the diff archive.

In some configurations, a manifest file containing data chunk tokens and payload file tokens is further processed to generate recipes that describe how to obtain the referenced data chunks and payload files. For example, a recipe may be added to a data chunk indicating how to obtain the data chunk from a payload file. When the payload file is stored in a single data chunk, the recipe may be a "copy" recipe that obtains the data chunk by making a copy of the payload file. The "copy" recipe may have a single parameter that points to the payload file. In some configurations, the parameter to the "copy" recipe is the payload file token that describes how to obtain the associated payload file. In other embodiments, additional recipes are layered on top of or underneath the recipe for obtaining the payload file, e.g. by adding a "decompression" recipe that first decompresses the payload file before the "copy" recipe copies the resulting bytes into the data chunk. As discussed in more detail below, if a payload file is generated from multiple data chunks, then a more complex "region" recipe may be used to extract the specific portion of a payload file that is used to generate the data chunk.

In some configurations, a payload file recipe describes how to construct the payload file. When initially generated by archive expansion and tokenization engine 630, the payload file recipes make reference to contents of the same archive. If the payload file is stored in the archive in a single data chunk, then a "copy" recipe may be used to generate the payload file, similar to how a "copy" recipe may be used to generate a data chunk from a payload file. Specifically, the payload file may be obtained by copying all of the bytes of a single data chunk. However, if a payload file is stored in the archive in more than one data chunk, a "concatenation" recipe takes multiple data chunks, from arbitrary locations throughout an archive, and concatenates them into a single payload file. A "concatenation" recipe may have two or more parameters. Some of the parameters may be data chunk tokens, e.g., a copy recipe that indicates where in the archive to copy a portion of the payload file. Other parameters may be tokens with a "blob" type, which represent the result of a nested operation, such as decrypting a data chunk. Other parameters may be tokens that generate padding, such as a "padding" recipe that yields a defined number of synthesized bytes, such as a defined number of zeros.

Padding recipes are included to ensure a complete binary correspondence between target archive 120 and target archive copy 220. The need for one of these placeholder byte streams may arise when an archive does not self-describe all of the bytes it contains. To accommodate this possibility, diff generation engine 130 may evaluate the generated archive manifest and the archive it was derived from to ensure that every byte of the archive is described by the manifest. When bytes in the archive are found to not be described by the manifest, synthetic byte streams such as "AllZero" and "Padding" may be inserted to accommodate them.

As discussed briefly above, a "region" recipe defines how to generate a data chunk from a particular region of a payload file. In some configurations, the "Region" recipe has three parameters: a parameter that identifies the payload file that contains the data chunk, an offset parameter that defines a start location of the data chunk within the payload file, and a length parameter that indicates the length of the data chunk within the payload file.

One of the benefits of the disclosed embodiments is the ability to compose recipes, increasing the ability to re-use existing data when distributing a diff archive. For example, a data chunk token may include a "region" recipe that refers to a payload file. In order make this payload file available to the program that extracts the data chunk, a nested "copy" recipe may be used to obtain the payload file from the archive. This nested "copy" recipe may include a file location of the payload file obtained by archive expansion and tokenization engine 630.

Additional recipes may be added to the system as necessary to enable a complete description of how to obtain an item referenced by a token. For example, if the ultimate consumer of the diff archive is a computing device that uses "big endian" number encodings, while the source archive stores numbers using "little endian" encoding, a "big endian" recipe may be inserted between the "region" recipe of the data chunk token and the "copy" recipe of the payload file to convert the payload file returned by the "copy" recipe into a "big endian" format.

As discussed above, archive expansion and tokenization engine 630 generates source archive manifest 660 and target archive manifest 690 and the associated expanded archive files 640 and 670. Archive expansion and tokenization engine 630 also processes the manifest files to add recipes for obtaining the items listed in them. Initially, the recipes refer to other items contained in the same archive. For example, recipes within the source archive manifest refer to other recipes and tokens within the source archive manifest 660 or to expanded source archive files 640 that were extracted from source archive 110. However, in order to create a diff archive that expands payload files of target archive 120 utilizing data contained in source archive 110, composite recipes are created by composing recipes found in target archive manifest 690 with recipes found in source archive manifest 660.

For example, a composite recipe for generating a data chunk of the target archive may include a "region" recipe from target archive manifest 690, but with a payload file token parameter from source archive manifest 660 replacing the payload file token from target archive manifest 690. This substitution may be made based on a determination that the same payload can be found in both source archive 110 and target archive 120, e.g. based on a comparison of file name, file length, hash value, or the like. The resulting composite recipe may be stored in a diff archive manifest of a diff archive.

When expanding the diff archive, a computing device may perform the composite recipe by extracting the referenced payload file from a copy of the source archive and applying the region recipe to obtain the desired data chunk.

In some cases, source archive 110 and target archive 120 have the same chunk, in which case the composite recipe may include a recipe for the target chunk that refers to the recipe for the identical chunk stored in the source archive 110. The data chunk generated by applying the composite recipe may be used to reconstitute the payload file found in both source archive 110 and target archive 120.

In other cases, the data chunk referenced in the target archive manifest is different from any of the data chunks stored in source archive 110, but both data chunks can be derived from a payload file that can be generated by both source archive 110 and target archive 120. In these cases, diff generation engine 130 may generate a "composite" recipe that yields the payload file. Some of the parameters of the "composite" recipe may refer to data chunks found in target archive 120, and which are copied as inline assets into a diff archive. Other parameters of the "composite" recipe may refer to data chunks found in source archive 110. For example, a "copy" recipe may refer to a data chunk in the source archive 110 if such a data chunk is usable as is. In other scenarios, a "region" recipe may be used to obtain the data chunk from a payload file of source archive 110.

However it is obtained, a chunk that was found in target archive 120 is reconstituted using data stored in source archive copy 210. This avoids having to retransmit the chunk found in target archive 120. Once it has been reconstituted from source archive copy 210, the chunk may be applied to reconstitute payload files found in target archive 120. The data chunk may also be used to create target archive copy 220, which may perform operations similar to a normal archive, and which may be used to install an application among other operations.

If the chunk or payload file from the source archive 110 and the target archive 120 is determined to not be identical, a binary delta may be computed using diff generation engine 130 and stored in the diff archive 140. A binary delta is generated by performing a binary comparison between a first file (or chunk) and a second file (or chunk), generating a delta file (or chunk) that encodes the difference between the two. An "apply delta" recipe may be inserted between a recipe for a target payload file and a recipe that obtains data from source archive 110, such that the output of the recipe that obtains data from source archive 110 is provided to the apply delta recipe and the output of the apply delta recipe is provided to the target payload file recipe. When it is applied, the apply delta recipe applies the binary delta stored in diff archive 140 to the result of the recipe that obtains data from copy of source archive 220. The result is the chunk that was originally identified in target archive 120.

Composite recipes may include additional layers and additional types of recipes. For example, a composite recipe may include a decompression recipe. A decompression recipe may be used when a payload file is compressed within source archive 110. One use of decompression and compression recipes is to access a payload files compressed with one compression technology, e.g. gzip, and storing it in an archive that uses a different compression technology, e.g. zstdcompression.

For example, a "ZstdCompression" recipe may be nested between a "concatenation" recipe that provides a payload file in part based on a data chunk found in source archive copy 210 and a "region" recipe that stores data chunks in the target archive. The effect of inserting the "ZstdCompression" recipe is to compress the payload file provided by the "concatenation" recipe before splitting the compressed file into multiple data chunks. In some cases, different types of compression may be applied to the same payload file in different archives. In this case, a corresponding "ZstdDecompression" (or "GzipDeompression") recipe may be added between the "ZstdCompression" recipe and the "Concatenation" recipe to account for the different types of compression. In this embodiment, the "concatenation" recipe reconstitutes the payload file in compressed form in part based on a data chunk from source archive copy 210. The "decompression" recipe decompresses the compressed payload file into an uncompressed payload file. The "compression" recipe re-compresses the payload file according to the type of compression used by target archive 120. A "region" recipe may then be used to obtain a data chunk of the re-compressed payload file for diff archive 140.

In some configurations, an archive concatenates multiple payload files into a slice before compressing them. In this case, a recipe may be introduced to the chain of recipes that decompresses the concatenated files before splitting them from a slice into individual payload files. The converse operation may also be included as a recipe—gathering payload files into a slice and compressing them, after which a copy recipe or a region recipe may be used to convey the contents of the compressed slice to data chunks. An even more complex scenario may occur when one of the payload files included in the slice is truncated to fit within the slice, while the remainder of the file is stored in a different slice. To handle this more complex scenario, one recipe may be introduced to decompress each slice, and another recipe may be introduced to splice together two halves of a payload file that was split between slices. Recipes to perform the converse operations may also be introduced.

FIG. 7 illustrates generating binary deltas from payload files in the source and target archives. Delta generation engine 730 is one component of diff generation engine. Delta generation engine 730 compares payload files and/or data chunks from source and target archives to determine a binary delta between them, if any. A binary delta is a binary difference between two files. A binary delta may be described as sequences of bytes and instructions that describe how to apply those bytes to one of the files. Applying the binary delta to one of the files yields the other file. Binary deltas computed by delta generation engine 730 are then added to delta archive files 740. Manifest entries for the binary deltas are similarly added to delta archive manifest 760.

Binary deltas may be employed when two payload files with the same or similar names are not binary equivalents. A binary delta allows a payload file to be adapted by diff application engine 230 to generate the version of the payload file that appeared in the target archive 120. This adaptation unlocks all of the other recipes described herein, e.g. region recipes to store the adapted file, compression recipes, and the like.

Figure 8:
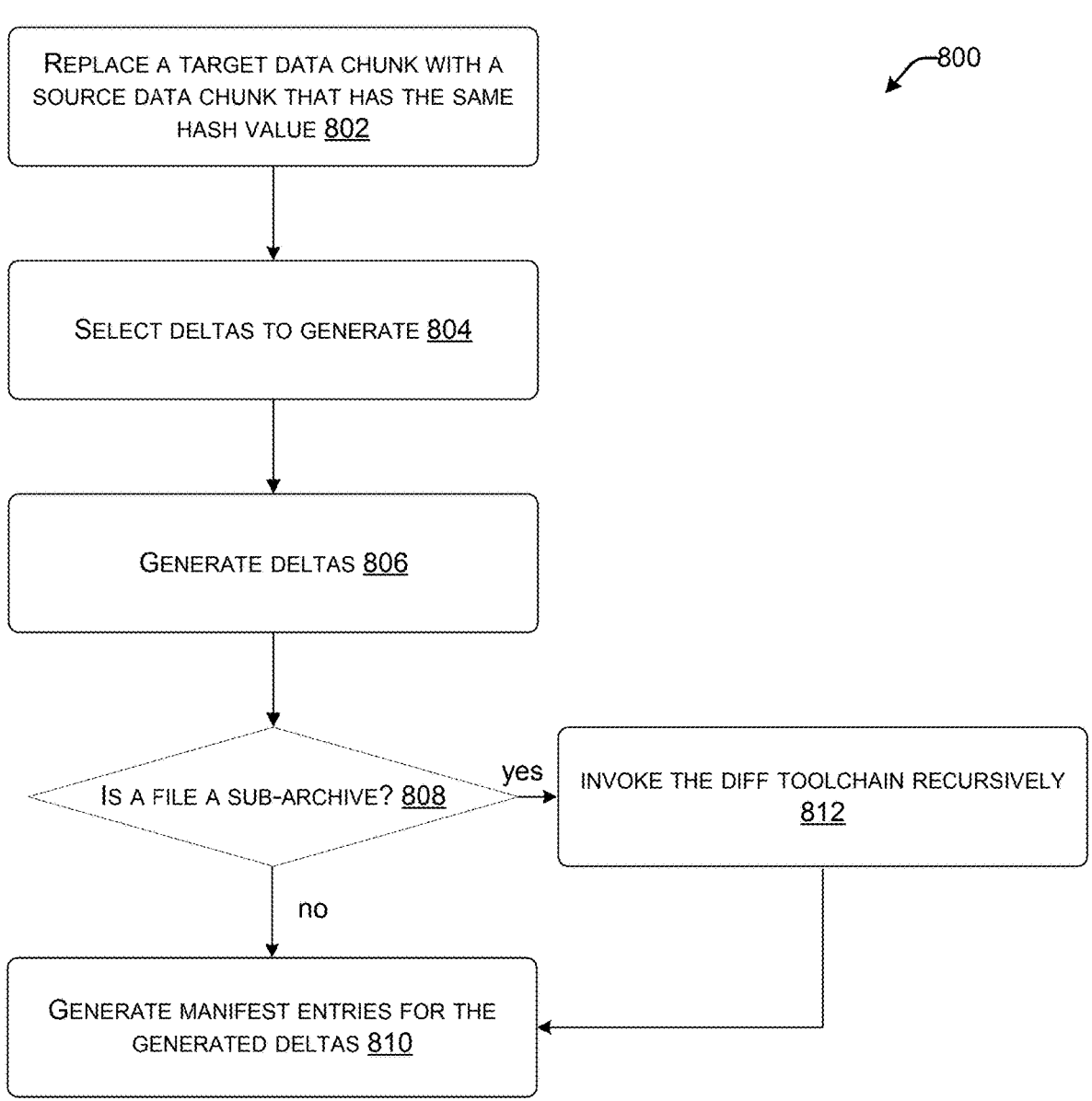
FIG. 8 is a flow diagram of an example method for generating a diff archive.

Turning now to FIG. 8, aspects of a routine for generating diffs between archives using a generic grammar are shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

With reference to FIG. 8, method 800 begins at operation 802, where a target data chunk is replaced with a source data chunk that has the same hash value.

Next at operation 804, deltas are selected for generation of payload files that are in both the source and target archives, but that are not binary matches. Source and target archives may be related by file name, identifier, path within the archive, or a combination thereof.

Next at operation 806, binary deltas are generated for the file identified in operation 804. One tool to generate a binary delta is BSDiff.

Next at operation 808, a determination is made whether a payload file is determined to be a sub-archive. If so, the method continues at operation 812, where the entire diff toolchain is invoked on this sub-archive to generate a sub-diff archive, which may in turn be stored in the diff archive 140.

Proceeding to operation 810, manifest entries are added to the inline assets 450 of diff archive 140.

With reference to FIG. 9, method 900 begins at operation 902, where a source recipe is determined for generating a source payload file from a source data chunk.

Next at operation 904, a target recipe is determined for generating a target data chunk from a target payload file.

Next at operation 906, a delta recipe is determined that, when applied to the source payload file, yields the target payload file.

Next at operation 908, the target, delta, and source recipes are composed into a composite recipe that generate the target data chunk from the source data chunk.

Proceeding to operation 910, the composite recipe is stored in a diff archive.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the methods 500, 800, and 900 are described herein as being implemented, at least in part, by modules running the features disclosed herein. These modules can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the methods 500, 800, and 900 may be also implemented in many other ways. For example, the methods 500, 800, and 900 may be implemented, at least in part, by a processor of another remote computer or a local circuit. In addition, one or more of the operations of the methods 500, 800, and 900 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 10:
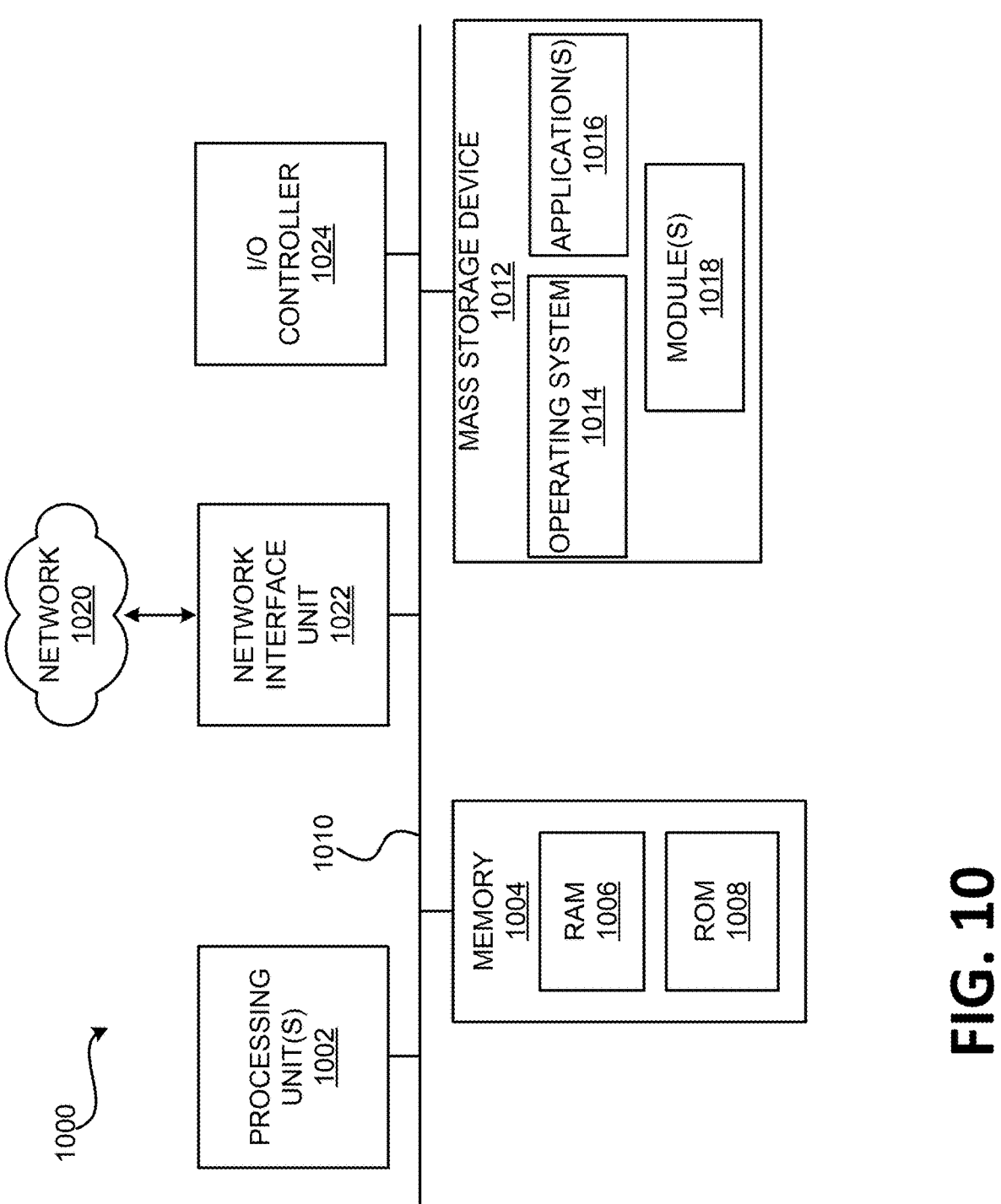
FIG. 10 is a computer architecture diagram illustrating an example computer hardware and software architecture for a computing system capable of implementing aspects of the techniques and technologies presented herein.

FIG. 10 shows additional details of an example computer architecture 1000 for a device, such as a computer or a server configured as part of the systems described herein, capable of executing computer instructions (e.g., a module or a program component described herein). The computer architecture 1000 illustrated in FIG. 10 includes processing unit(s) 1002, a system memory 1004, including a random-access memory 1006 (RAM) and a read-only memory (ROM) 1008, and a system bus 1010 that couples the memory 1004 to the processing unit(s) 1002.

Processing unit(s), such as processing unit(s) 1002, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 1000, such as during startup, is stored in the ROM 1008. The computer architecture 1000 further includes a mass storage device 1012 for storing an operating system 1014, application(s) 1016, modules 1018, and other data described herein.

The mass storage device 1012 is connected to processing unit(s) 1002 through a mass storage controller connected to the bus 1010. The mass storage device 1012 and its associated computer-readable media provide non-volatile storage for the computer architecture 1000. Although the description of computer-readable media contained herein refers to a mass storage device, it should be appreciated by those skilled in the art that computer-readable media can be any available computer-readable storage media or communication media that can be accessed by the computer architecture 1000.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 1000 may operate in a networked environment using logical connections to remote computers through the network 1020. The computer architecture 1000 may connect to the network 1020 through a network interface unit 1022 connected to the bus 1010. The computer architecture 1000 also may include an input/output controller 1024 for receiving and processing input from a number of other devices, including a keyboard, mouse, touch, or electronic stylus or pen. Similarly, the input/output controller 1024 may provide output to a display screen, a printer, or other type of output device.

It should be appreciated that the software components described herein may, when loaded into the processing unit(s) 1002 and executed, transform the processing unit(s) 1002 and the overall computer architecture 1000 from a general-purpose computing system into a special-purpose computing system customized to facilitate the functionality presented herein. The processing unit(s) 1002 may be constructed from any number of transistors or other discrete circuit elements, which may individually or collectively assume any number of states. More specifically, the processing unit(s) 1002 may operate as a finite-state machine, in response to executable instructions contained within the software modules disclosed herein. These computer-executable instructions may transform the processing unit(s) 1002 by specifying how the processing unit(s) 1002 transition between states, thereby transforming the transistors or other discrete hardware elements constituting the processing unit(s) 1002.

FIG. 11 depicts an illustrative distributed computing environment 1100 capable of executing the software components described herein. Thus, the distributed computing environment 1100 illustrated in FIG. 11 can be utilized to execute any aspects of the software components presented herein. For example, the distributed computing environment 1100 can be utilized to execute aspects of the software components described herein.

Accordingly, the distributed computing environment 1100 can include a computing environment 1102 operating on, in communication with, or as part of the network 1104. The network 1104 can include various access networks. One or more computing devices 1106A-1106N can communicate with the computing environment 1102 via the network 1104. In one illustrated configuration, the computing devices 1106 include a computing device 1106A such as a laptop computer, a desktop computer, or other computing device; a tablet computing device 1106B; a mobile computing device 1106C such as a mobile telephone, a smart phone, or other mobile computing device; a server computer 1106D; and/or other devices 1106N. It should be understood that any number of computing devices 1106 can communicate with the computing environment 1102.

In various examples, the computing environment 1102 includes servers 1108, data storage 1110, and one or more network interfaces 1112. The servers 1108 can host various services, virtual machines, portals, and/or other resources. In the illustrated configuration, the servers 1108 host virtual machines 1114, Web portals 1116, mailbox services 1118, storage services 1120, and/or, social networking services 1122. As shown in FIG. 11 the servers 1108 also can host other services, applications, portals, and/or other resources ("other resources") 1124.

As mentioned above, the computing environment 1102 can include the data storage 1110. According to various implementations, the functionality of the data storage 1110 is provided by one or more databases operating on, or in communication with, the network 1104. The functionality of the data storage 1110 also can be provided by one or more servers configured to host data for the computing environment 1102. The data storage 1110 can include, host, or provide one or more real or virtual datastores 1126A-1126N (hereinafter referred to collectively and/or generically as "datastores 1126"). The datastores 1126 are configured to host data used or created by the servers 1108 and/or other data. That is, the datastores 1126 also can host or store web page documents, word documents, presentation documents, data structures, algorithms for execution by a recommendation engine, and/or other data utilized by any application program. Aspects of the datastores 1126 may be associated with a service for storing files.

The computing environment 1102 can communicate with, or be accessed by, the network interfaces 1112. The network interfaces 1112 can include various types of network hardware and software for supporting communications between two or more computing devices including, the computing devices and the servers. It should be appreciated that the network interfaces 1112 also may be utilized to connect to other types of networks and/or computer systems.

It should be understood that the distributed computing environment 1100 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1100 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 1100 to utilize the functionality described herein for providing the techniques disclosed herein, among other aspects.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable.

Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

The disclosure presented herein also encompasses the subject matter set forth in the following clauses:

Example 1: A method for generating a diff archive based on a source archive and a target archive, the method comprising: determining a source recipe for generating a source payload file from a source data chunk of the source archive; determining a target recipe for generating a target data chunk from a target payload file of the target archive; determining a delta recipe that, when applied to the source payload file, yields the target payload file; composing the target recipe, the delta recipe, and the source recipe into a composite recipe that generates a copy of the target data chunk, at least in part, from a copy of the source data chunk; and store the composite recipe in the diff archive, wherein applying the diff archive with data from a source archive copy generates a target archive copy.

Example 2: The method of Example 1, further comprising: transmitting the diff archive to a computing device, wherein the computing device has access to the source archive copy, and wherein the computing device applies the diff archive with data from the source archive copy to generate the target archive copy.

Example 3: The method of Example 1, wherein the source data chunk is one of a plurality of source data chunks that are stored within the source archive and that are usable to extract the source payload file, and wherein the source recipe for generating the source payload file comprises a concatenation recipe that concatenates the plurality of source data chunks into the source payload file.

Example 4: The method of Example 1, wherein the target data chunk is one of a plurality of target data chunks that are stored within the target archive and that are usable to extract the target payload file, and wherein the target recipe comprises a region recipe that copies the plurality of target data chunks from the target payload file to individual offsets within the target payload file.

Example 5: The method of Example 1, wherein the target recipe comprises a target payload file parameter that identifies a payload file of the target archive that the target data chunk is derived from, and wherein the target recipe, the delta recipe, and the source recipe are composed in part by replacing the target payload file parameter with the delta recipe.

Example 6: The method of Example 5, wherein the delta recipe comprises a source payload file parameter, and wherein the target recipe, the delta recipe, and the source recipe are composed in part by replacing the source payload file parameter with the source recipe.

Example 7: The method of Example 1, further comprising: computing a binary delta between the source payload file and the target payload file, wherein the delta recipe applies the binary delta to the source payload file to yield a copy of the target payload file.

Example 8: The method of Example 6, wherein the source payload file parameter comprises a first source payload file parameter, and wherein the composite recipe further includes an intermediate recipe with a second source payload file parameter, the method further comprising: replacing the first source payload file parameter of the delta recipe with the intermediate recipe; and replacing the second source payload file parameter of the intermediate recipe with the source recipe.

Example 9: The method of Example 8, wherein the intermediate recipe compresses the source payload file, decompresses the source payload file, encrypts the source payload file, decrypts the source payload file, combines the source payload file with other source payload files, or combines a portion of the source payload file with other source payload files.

Example 10: The method of Example 6, wherein the target payload file parameter comprises a first target payload file parameter, and wherein the composite recipe further includes an intermediate recipe with a second target payload file parameter, the method further comprising: replacing the first target payload file parameter of the target recipe with the intermediate recipe; and replacing the second target payload file parameter of the intermediate recipe with the delta recipe.

Example 11: The method of Example 10, wherein the intermediate recipe decompresses, compresses, decrypts, or encrypts, the output of the delta recipe.

Example 12: A computing device comprising: a processor; and a memory storing computer-executable instructions thereupon which, when executed by the processor, cause the computing device to perform operations comprising: determine a source recipe for generating a source payload file from a source data chunk of a source archive; determine a target recipe for generating a target data chunk from a target payload file of a target archive; determine a delta recipe that, when applied to the source payload file, yields the target payload file; compose the target recipe, the delta recipe, and the source recipe into a composite recipe that generates a copy of the target data chunk, at least in part, from a copy of the source data chunk; and store the composite recipe in a diff archive, wherein applying the diff archive with data from a source archive copy generates a target archive copy.

Example 13: The computing device of Example 12, wherein the computer-executable instructions further cause the computing device to: determine that the source payload file comprises a sub archive; wherein the source recipe recursively applies the method for generating a diff archive based to the sub archive.

Example 14: The computing device of Example 12, wherein the computer-executable instructions further cause the computing device to: generate a source archive metadata file that includes a first plurality of data chunk tokens, wherein the source data chunk is referenced by one of the first plurality of data chunk tokens; and generate a target archive metadata file that includes a second plurality of data chunk tokens, wherein the target data chunk is referenced by one of the second plurality of data chunk tokens, and wherein an individual data chunk token includes an archive offset, a length, and a hash of the corresponding data chunk.

Example 15: The computing device of Example 14, wherein the source archive metadata file includes a payload file token that includes a filename of the source payload file and a recipe for generating the source payload file that references one or more of the first plurality of data chunk tokens.

Example 16: The computing device of Example 14, wherein the target archive metadata file includes a payload file token that includes a filename of the target payload file and a recipe for generating one or more of the second plurality of data chunk tokens from the target payload file.

Example 17: The computing device of Example 14, wherein the source archive metadata file is generated by an archive reader that is specific to a particular archive type, and wherein the archive reader uses information specific to the particular archive type to open the source archive, identify data chunks, and generate the first plurality of data chunk tokens to refer to the identified data chunks.

Example 18: The method of Example 14, further comprising: analyzing the target archive and the second plurality of data chunk tokens to identify a region of the target archive that is not represented by any of the second plurality of data chunk tokens; and adding a placeholder data chunk token to the second plurality of data chunk tokens that references the region of the target archive.

Example 19: A system comprising: a processor; and a memory storing computer-executable instructions thereupon which, when executed by the processor, cause the system to perform operations comprising: extracting, from a diff archive, a token that includes a chunk recipe, wherein the chunk recipe includes a reference to a data chunk stored in a source archive copy, and wherein expanding the diff archive yields a payload file of a target archive; applying the chunk recipe to extract the data chunk from the source archive copy; extracting, from the diff archive, a binary delta; and applying the binary delta to the data chunk extracted from the source archive copy to generate the payload file of the target archive.

Example 20: The system of Example 19, wherein the target archive is a subsequent version of the source archive.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for generating a diff archive from a source payload file stored in a source archive and a target payload file stored in a target archive, the method comprising:

generating, based on the source archive, a source recipe that, when applied to a copy of the source archive, generates a copy of the source payload file from a plurality of source data chunks stored in the copy of the source archive;

generating a delta recipe that, when applied to the copy of the source payload file, generates a copy of the target payload file;

generating a target recipe that, when applied to the copy of the target payload file, splits the copy of the target payload file into a plurality of target data chunks and stores the plurality of target data chunks in a copy of the target archive;

composing the target recipe, the delta recipe, and the source recipe into a composite recipe;

storing the composite recipe in the diff archive; and transmitting the diff archive to a computing device, wherein applying the composite recipe of the diff archive causes the computing device to:

apply the source recipe to generate the copy of the source payload file from the plurality of source data chunks stored in the copy of the source archive, apply the delta recipe to generate the copy of the target payload file from the source payload file, and apply the target recipe to split the copy of the target payload file into the plurality of target data chunks and store the plurality of target data chunks in the copy of the target payload file.

2. The method of claim 1, wherein the computing device is caused to install a software application update from the copy of the target archive.

3. The method of claim 1, wherein the source recipe comprises a concatenation recipe that concatenates the plurality of source data chunks into the copy of the source payload file.

4. The method of claim 1, wherein the target recipe comprises a region recipe that extracts the plurality of target data chunks from the copy of the target payload file.

5. The method of claim 1, wherein the target recipe, the delta recipe, and the source recipe are composed in part by setting a target payload file parameter of the target recipe to the delta recipe, such that the target recipe is applied to an output of the delta recipe.

6. The method of claim 5, wherein the target recipe, the delta recipe, and the source recipe are composed in part by setting a source payload file parameter of the delta recipe to the source recipe.

7. The method of claim 1, further comprising:

computing a binary delta between the source payload file and the target payload file;

storing the binary delta in the diff archive, wherein applying the composite recipe further causes the computing device is to apply the binary delta to the copy of the source payload file to create the copy of the target payload file.

8. The method of claim 6, wherein the source payload file parameter comprises a first source payload file parameter, and wherein the composite recipe further includes an intermediate recipe with a second source payload file parameter, the method further comprising:

setting the first source payload file parameter of the delta recipe to the intermediate recipe; and setting the second source payload file parameter of the intermediate recipe to the source recipe.

9. The method of claim 8, wherein the intermediate recipe compresses the source payload file, decompresses the source payload file, encrypts the source payload file, decrypts the source payload file, combines the source payload file with other source payload files, or combines a portion of the source payload file with other source payload files.

10. The method of claim 6, wherein the target payload file parameter comprises a first target payload file parameter, and wherein the composite recipe further includes an intermediate recipe with a second target payload file parameter, the method further comprising:

setting the first target payload file parameter of the target recipe to the intermediate recipe; and setting the second target payload file parameter of the intermediate recipe to the delta recipe.

11. The method of claim 10, wherein the intermediate recipe decompresses, compresses, decrypts, or encrypts, the output of the delta recipe.

12. A computing device comprising:

a processor; and a memory storing computer-executable instructions thereupon which, when executed by the processor, cause the computing device to perform operations comprising:

generate, based on a source archive, a source recipe that, when applied to a copy of the source archive, generates a copy of a source payload file from a plurality of source data chunks stored in the copy of the source archive;

generate a delta recipe that, when applied to the copy of the source payload file, generates a copy of the target payload file;

generate a target recipe that, when applied to the copy of the target payload file, splits the copy of the target payload file into a plurality of target data chunks and stores the plurality of target data chunks in a copy of the target archive;

compose the target recipe, the delta recipe, and the source recipe into a composite recipe;

store the composite recipe in a diff archive; and transmit the diff archive to a client computing device, causing the client computing device to:

apply the composite recite of the diff archive to generate the copy of the target archive from the copy of the source archive, and install a software update by applying the copy of the target archive.

13. The computing device of claim 12, wherein the computer-executable instructions further cause the computing device to:

determine that the source payload file comprises a sub archive; wherein the source recipe recursively applies a composite diff generation process to to the sub archive.

14. The computing device of claim 12, wherein the computer-executable instructions further cause the computing device to:

generate a source archive metadata file that includes a first plurality of data chunk tokens that refer to the plurality of source data chunks; and generate a target archive metadata file that includes a second plurality of data chunk tokens that refer to the plurality of target data chunks, and wherein an individual data chunk token includes an offset into an archive, a length, and a hash of the corresponding data chunk.

15. The computing device of claim 14, wherein the source archive metadata file includes a payload file token that includes a filename of the source payload file and a recipe for generating the source payload file that references one or more of the first plurality of data chunk tokens.

16. The computing device of claim 14, wherein the target archive metadata file includes a payload file token that includes a filename of the target payload file and a recipe for generating one or more of the second plurality of data chunk tokens from the target payload file.

17. The computing device of claim 14, wherein the source archive metadata file is generated by an archive reader that is specific to a particular archive type, and wherein the archive reader uses information specific to the particular archive type to open the source archive, identify data chunks, and generate the first plurality of data chunk tokens to refer to the identified data chunks.

18. The computing device of claim 14, wherein the computer-executable instructions further cause the computing device to:

analyze the target archive and the second plurality of data chunk tokens to identify an unrepresented region of the target archive that is not represented by any of the second plurality of data chunk tokens; and add a placeholder data chunk token to the second plurality of data chunk tokens, wherein the placeholder data chunk token represents the unrepresented region of the target archive, wherein the placeholder data chunk token causes a region of the copy of the target archive to be created that corresponds to the unrepresented region of the target archive, causing the region of the copy of the target archive to be a byte-for-byte copy of the unrepresented region of the target archive.

19. A system comprising:

a processor; and a memory storing computer-executable instructions thereupon which, when executed by the processor, cause the system to perform operations comprising:

receiving a diff archive;

extracting, from the diff archive, a composite recipe that includes a chunk recipe, a binary delta, and a region recipe, wherein the chunk recipe includes a reference to a data chunk stored in a copy of a source archive;

applying the chunk recipe to extract the data chunk from the source archive;

generating a source payload file in part from the extracted data chunk;

extracting, from the diff archive, the binary delta;

applying the binary delta to the generated source payload file to generate a target payload file;

extracting, from the diff archive, the region recipe;

applying the region recipe to generate a target data chunk from the generated target payload file;

generating a target archive that stores the target data chunk;

extracting a copy of the generated target payload file from the target archive; and installing a software update on a computing device using the extracted copy of the generated target payload file.

20. The system of claim 19, wherein the target archive is a subsequent version of the source archive.

* * * * *